US012769239B2

(12) United States Patent
Tai

(10) Patent No.: US 12,769,239 B2
(45) Date of Patent: Oct. 20, 2026

(54) IMAGE FORMING APPARATUS, IMAGE FORMING SYSTEM, COMPUTER-READABLE STORAGE MEDIUM STORING PROGRAM, AND METHOD OF CONTROLLING IMAGE FORMING APPARATUS

(71) Applicant: Konica Minolta, Inc., Tokyo (JP)

(72) Inventor: Haruka Tai, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/765,158

(22) Filed: Jul. 5, 2024

(65) Prior Publication Data

US 2025/0036062 A1 Jan. 30, 2025

(30) Foreign Application Priority Data

Jul. 25, 2023 (JP) ................................ 2023-120348

(51) Int. Cl.
*G03G 15/00* (2006.01)

(52) U.S. Cl.
CPC ..... *G03G 15/6529* (2013.01); *G03G 15/5016* (2013.01); *G03G 15/5029* (2013.01); *G03G 15/5079* (2013.01); *G03G 2215/00708* (2013.01)

(58) Field of Classification Search
CPC ........... G03G 15/5029; G03G 15/5062; G03G 15/6529; G03G 15/6564; G03G 15/6508; G03G 21/00
See application file for complete search history.

(56) References Cited

U.S. PATENT DOCUMENTS 11,487,228 B2 * 11/2022 Kurata ............... G03G 15/5029
2005/0168521 A1 * 8/2005 Suzuki ................... B41J 11/007 347/33
2009/0232521 A1 * 9/2009 Imine ..................... G03G 15/55 399/16
2012/0269563 A1 * 10/2012 Ui .......................... B65H 9/006 399/367
2019/0187605 A1 * 6/2019 Tai ..................... G03G 15/5029
2021/0061593 A1 * 3/2021 Tokuno ................ B65H 3/5215

FOREIGN PATENT DOCUMENTS

JP 2004-359449 A 12/2004

* cited by examiner

*Primary Examiner* — Jessica L Eley
(74) *Attorney, Agent, or Firm* — SQUIRE PATTON BOGGS (US) LLP

(57) ABSTRACT

An image forming apparatus includes, an image former that forms an image on a sheet; a conveyance path in which the sheet is conveyed to the image former; a sheet detector that is provided in the conveyance path and that detects a type of the sheet conveyed on the conveyance path; and a controller that performs control related to maintenance of the conveyance path based on the type of the sheet detected by the sheet detector.

8 Claims, 5 Drawing Sheets

IMAGE FORMING APPARATUS, IMAGE FORMING SYSTEM, COMPUTER-READABLE STORAGE MEDIUM STORING PROGRAM, AND METHOD OF CONTROLLING IMAGE FORMING APPARATUS

BACKGROUND OF THE INVENTION

Technical Field

The present invention relates to an image forming apparatus that performs maintenance control of a conveyance system, an image forming system, a computer-readable storage medium storing a program, and a method of controlling an image forming apparatus.

Description of Related Art

In an image forming apparatus that forms an image on a sheet, a configuration in which the sheet is conveyed by a conveyance roller is used. When sheet dust adheres to the conveyance roller, the conveying force decreases. When the conveying force decreases, sheet conveyance failure occurs. However, there are various types of sheets used in image forming apparatuses. For example, when a sheet having a large amount of sheet dust is used, there is a possibility that the conveying force decreases earlier than expected. Therefore, maintenance such as inspection, cleaning, and replacement of the conveyance roller or the like is required.

Conventionally, there has been proposed an image forming apparatus including a plurality of sheet trays, a sheet feed roller provided with a roller cleaning section, and an information input unit for recording sheets placed on the sheet trays. In this device, cleaning conditions of the roller cleaning means are changed when a particular type of recording sheet is selected (see, for example, Japanese Unexamined Patent Publication No. 2004-359449).

In a conventional image forming apparatus, it is necessary for a user or the like of the image forming apparatus to input information of a recording sheet placed on a sheet tray. Therefore, every time the sheet type is changed, it is necessary to input information about the sheet type. Therefore, it takes time and effort.

SUMMARY OF THE INVENTION

The present invention has been made in order to solve such a problem, and provides an image forming apparatus, an image forming system, a computer-readable storage medium storing a program, and a method of controlling an image forming apparatus, in which maintenance control can be performed in accordance with a sheet type without inputting the sheet type in advance.

In order to solve the above-described problem, the present invention is an image forming apparatus including, an image former that forms an image on a sheet; a conveyance path in which the sheet is conveyed to the image former; a sheet detector that is provided in the conveyance path and that detects a type of the sheet conveyed on the conveyance path; and a controller that performs control related to maintenance of the conveyance path based on the type of the sheet detected by the sheet detector.

According to another aspect, the present invention is an image forming system including: an image forming apparatus, wherein the image forming apparatus includes, an image former that forms an image on a sheet; a conveyance path in which the sheet is conveyed to the image former; a sheet detector that is provided in the conveyance path and that detects a type of the sheet conveyed on the conveyance path; and a controller that performs control related to maintenance of the conveyance path based on the type of the sheet detected by the sheet detector.

According to another aspect, the present invention is a computer-readable storage medium which stores a program to be executed by a controller of an image forming apparatus including an image former that forms an image on a sheet, and a conveyance path in which the sheet is conveyed to the image former, the program that causes the controller to execute: detecting, by a sheet detector provided in the conveyance path, a type of the sheet conveyed on the conveyance path, and acquiring the type of the sheet detected by the sheet detector; and performing control related to maintenance of the conveyance path based on the type of the sheet detected by the sheet detector.

According to another aspect, the present invention is also a method of controlling an image forming apparatus including an image former that forms an image on a sheet, and a conveyance path in which the sheet is conveyed to the image former, the method including: detecting, by a sheet detector provided in the conveyance path, a type of the sheet conveyed on the conveyance path, and acquiring the type of the sheet detected by the sheet detector; and performing control related to maintenance of the conveyance path based on the type of the sheet detected by the sheet detector.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

Embodiments of an image forming apparatus, an image forming system, a computer-readable storage medium storing a program, and a method of controlling an image forming apparatus of the present invention will be described below with reference to the drawings.

<Configuration Example of Image Forming Apparatus, Image Forming System, and Computer-Readable Storage Medium Storing Program of Present Embodiment>

Figure 1:
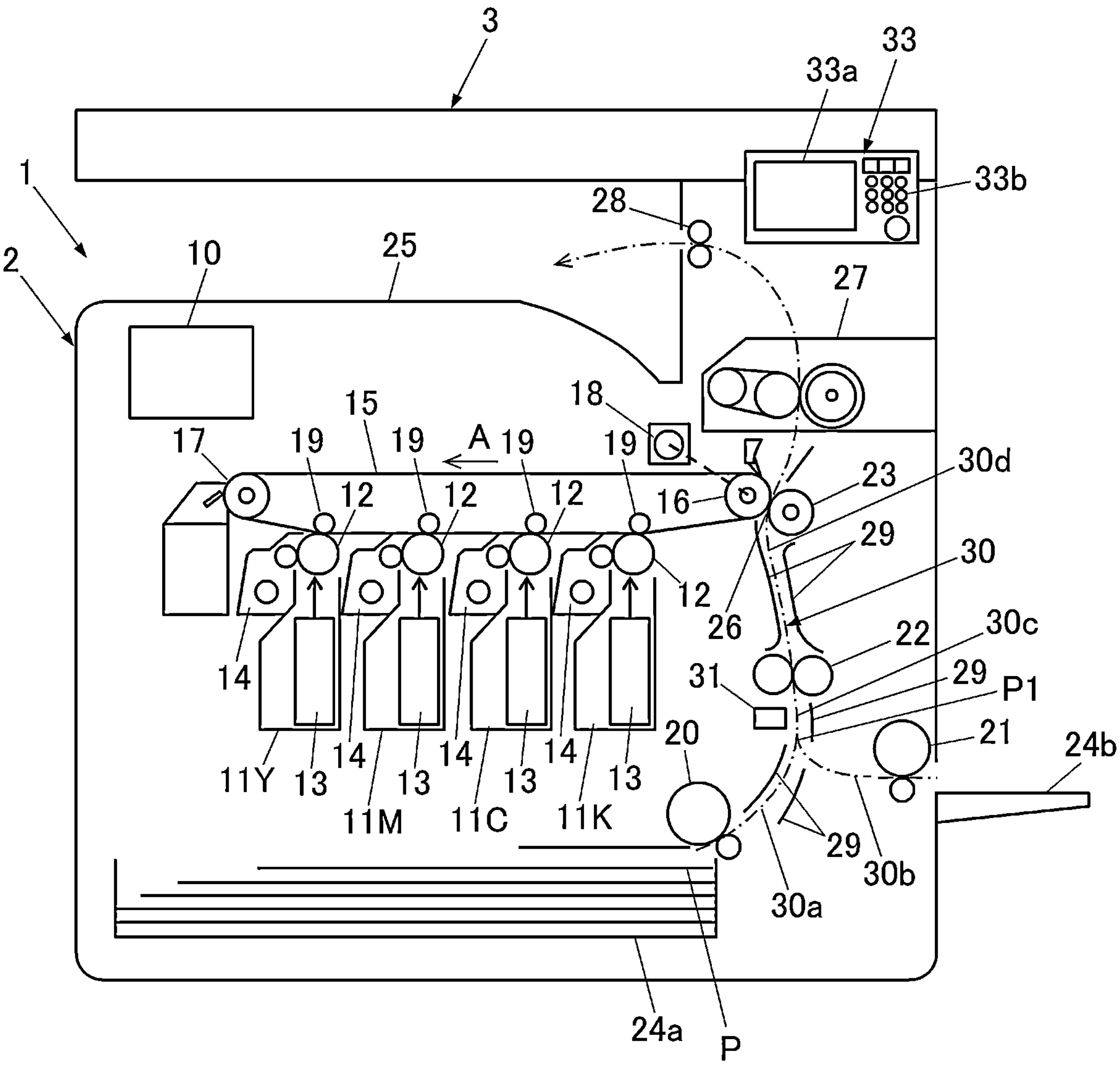
FIG. 1 is an overall configuration diagram illustrating an example of an image forming apparatus of the present embodiment.
Figure 2:
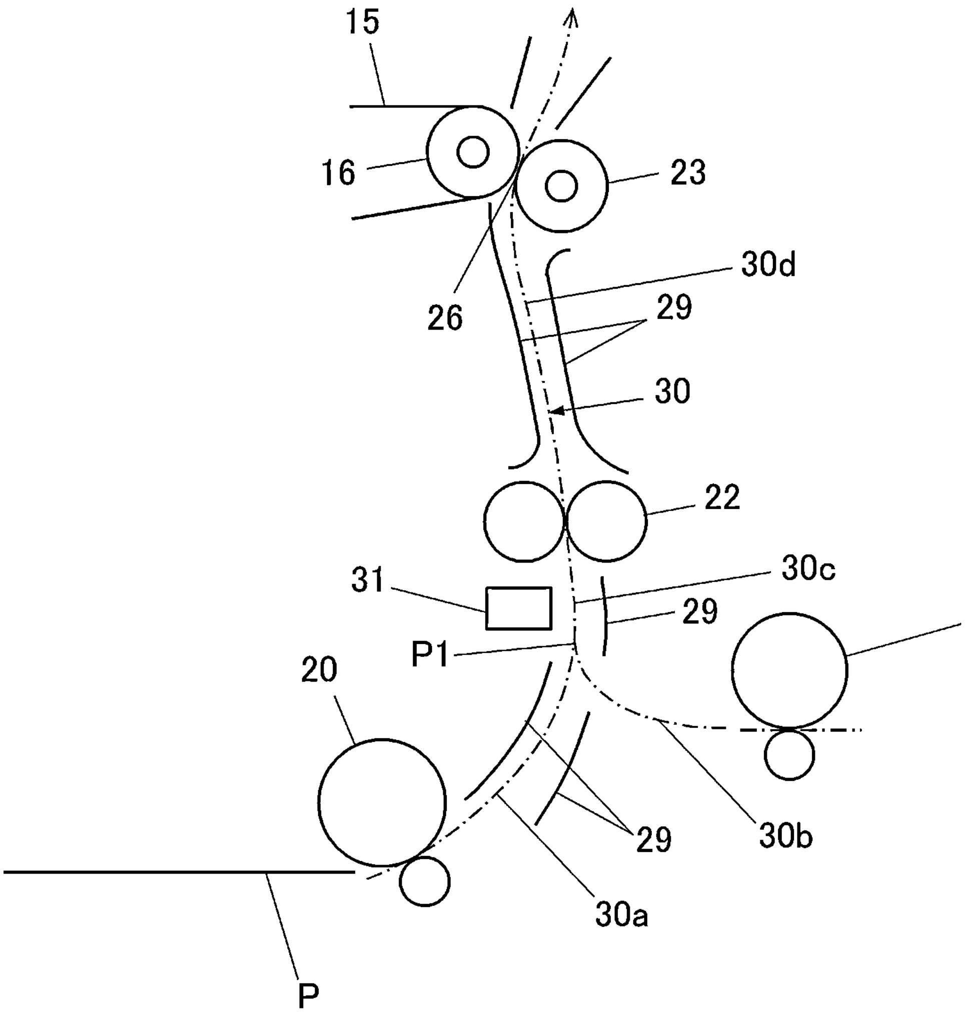
FIG. 2 is a configuration diagram of a main part showing an example of the image forming apparatus of the present embodiment.

FIG. 1 is an overall configuration diagram illustrating an example of an image forming apparatus according to the present embodiment, and FIG. 2 is a main part configuration diagram illustrating an example of an image forming apparatus according to the present embodiment.

The image forming apparatus 1 forms an image by an electrophotographic method. The image forming apparatus 1 includes, for example, an apparatus body 2 and an image reading unit 3.

The image reading unit 3, which is a known unit, optically reads a document and converts it into electrical signals. The image forming apparatus 1 forms, for example, a color image. In this case, the image reading unit 3 decomposes the optically read image of the document into the three primary colors of RGB and converts the colors into electrical signals. The image reading unit 3 transfers the electric signal to a controller 10.

The image forming apparatus 1 includes imaging units 11 (11Y, 11M, 11C, and 11K). Each of the imaging units 11Y, 11M, 11C, and 11K includes a photosensitive drum 12, a laser scanning optical unit 13, and a developing unit 14. In addition, each of the imaging units 11Y, 11M, 11C, and 11K includes a charging device (not shown), a cleaner for residual toner and residual charges, and the like.

The controller 10 transfers image data corresponding to each color of Y (yellow), M (magenta), C (cyan), and K (black) to the laser scanning optical unit 13. The laser scanning optical unit 13 forms a latent image on the photosensitive drum 12. The developing unit 14 develops the latent image on the photosensitive drum 12, and forms a toner image for each color. Such an image forming process is well known, and a detailed description thereof will be omitted.

The image forming apparatus 1 includes an intermediate transfer belt 15. The intermediate transfer belt 15 is stretched around the driving roller 16 and the driven roller 17 in an endless manner. The driving roller 16 is rotationally driven by a motor 18. Thus, the intermediate transfer belt 15 rotates in the direction of arrow A. The photosensitive drum 12 of each of the imaging units 11Y, 11M, 11C, and 11K faces the primary transfer roller 19 via the intermediate transfer belt 15.

The image forming apparatus 1 includes sheet feed rollers 20 and 21, a registration roller 22, and a secondary transfer roller 23. The image forming apparatus 1 further includes a sheet feed cassette 24*a*, a manual sheet feed tray 24*b*, and a sheet ejection section 25.

The sheet feed cassette 24*a* is provided at a lower stage of the apparatus body 2. The sheet feed cassette 24*a* stores a plurality of sheets P in a stacked manner. The sheet feed roller 20 feeds the sheet P from the sheet feed cassette 24*a*. The sheet feed roller 21 feeds the sheet P from the manual sheet feed tray 24*b*. The secondary transfer roller 23 faces the driving roller 16 via the intermediate transfer belt 15. The secondary transfer nip portion 26 is formed at a portion where the secondary transfer roller 23 and the intermediate transfer belt 15 face each other. The registration roller 22 conveys the sheet P fed by the sheet feed roller 20 or the sheet feed roller 21 to the secondary transfer nip portion 26.

The toner images formed on the respective photosensitive drums 12 are sequentially primary-transferred and combined onto the intermediate transfer belt 15 by electric fields applied from the primary transfer rollers 19. The composite image is secondarily transferred onto the sheet P by an electric field applied from the secondary transfer roller 23 at the secondary transfer nip portion 26. Thereafter, the sheet P is conveyed to the fixing unit 27 where the toner is heated and fixed, and then ejected from the discharge roller 28 to the sheet ejection section 25 of the apparatus body 2. As described above, in the image forming apparatus 1, an image forming section is formed of the secondary transfer roller 23 transferring the toner image onto the sheet P, the intermediate transfer belt 15 facing the secondary transfer roller 23, and the like.

The image forming apparatus 1 includes a sheet guide 29. The sheet guide 29 is provided to face the surface of the sheet P. The image forming apparatus 1 includes a conveyance path 30. The conveyance path 30 includes rollers such as a sheet feed roller 20, a sheet feed roller 21, and a registration roller 22, a sheet guide 29, and the like.

The conveyance path 30 includes a conveyance path 30*a* connected to the sheet feed cassette 24*a* and a conveyance path 30*b* connected to the manual sheet feed tray 24*b*. Furthermore, the conveyance path 30 includes a position P1 where the conveyance path 30*a* joins the conveyance path 30*b* and a conveyance path 30*c* that passes between the registration rollers 22. Further, the conveyance path 30 includes a conveyance path 30*d* between the registration roller 22 and the discharge roller 28.

The image forming apparatus 1 includes a sheet detecting section 31. The sheet detecting section 31 detects the type of the sheet P by using, for example, reflection of light or transmission of light. For this reason, the sheet detecting section 31 is configured by, for example, an optical sensor having a light emitter and a light receiver. An optical sensor of the sheet detecting section 31 faces the sheet guide 29. The sheet detecting section 31 is provided in a position P1 where the conveyance path 30*a* joins the conveyance path 30*b* and a conveyance path 30*c* that passes between the registration rollers 22.

Both the sheet P fed from the sheet feed cassette 24*a* and the sheet P fed from the manual sheet feed tray 24*b* pass through the conveyance path 30*c*. Therefore, the sheet detecting section 31 is provided on the conveyance path 30*c*. The sheet detecting section 31 detects the type of the sheet P and counts the number of passed sheets for each sheet type. Thus, the sheet detecting section 31 can count the total number of passed sheets of the sheet P fed from the sheet feed cassette 24*a* and the sheet P fed from the manual sheet feed tray 24*b*.

Note that the image forming apparatus 1 includes an optical sensor in the conveyance path 30 in order to control the conveyance speed of the sheet P and the like. Therefore, the sheet detecting section 31 may use such an existing sensor.

Figure 3:
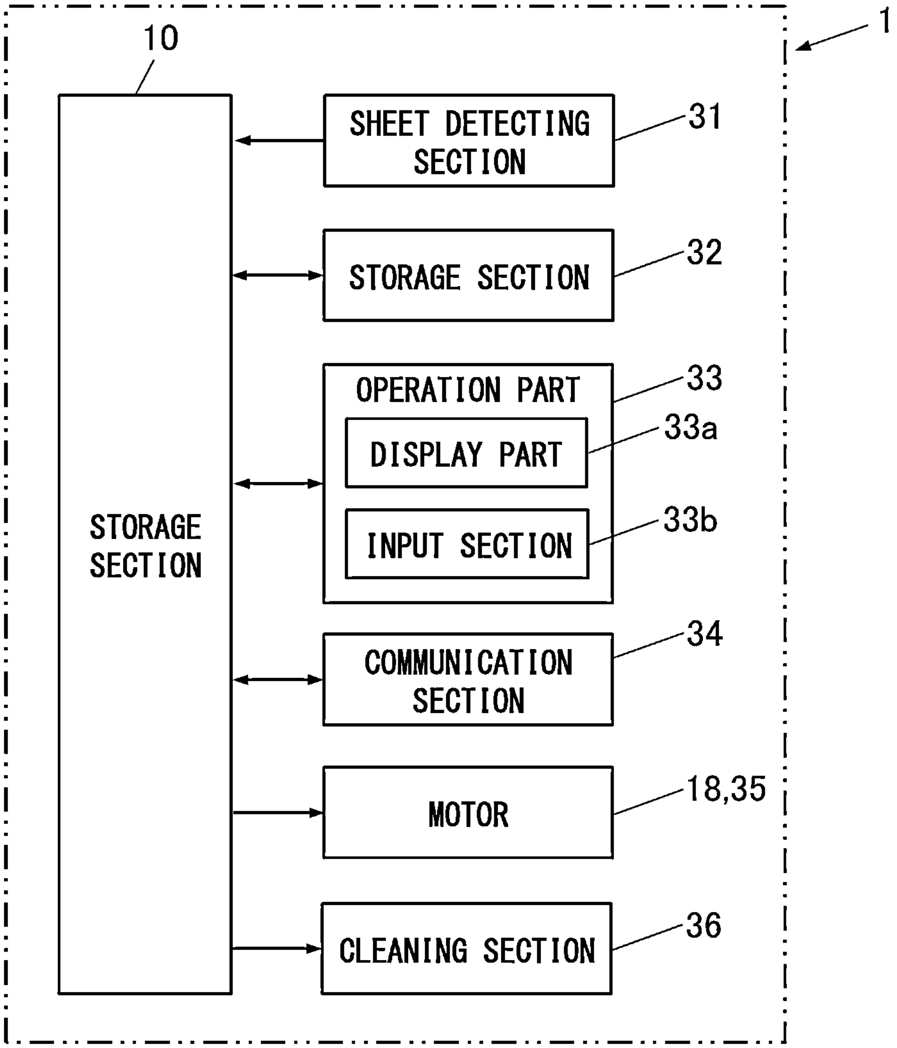
FIG. 3 is a functional block diagram illustrating an example of the image forming apparatus of the present embodiment.

FIG. 3 is a functional block diagram illustrating an example of the image forming apparatus of the present embodiment. The image forming apparatus 1 includes the controller 10, a storage section 32, an operation part 33, and a communication section 34.

The controller 10 includes a central processing unit (CPU), a random access memory (RAM), a read only memory (ROM), and the like. The storage section 32 includes a hard disk drive (HDD) or the like. The operation part 33 includes a display part 33*a* such as a liquid-crystal display for displaying information, a touch screen provided on the display part 33*a*, and an input section 33*b* such as a button independent of the touch screen. The communication section 34 is formed with a communication interface connectable to a local area network (LAN), the Internet, or the like.

The storage section 32 stores a program for performing predetermined control related to maintenance in accordance with a sheet type and the number of passed sheets. The predetermined control related to maintenance is also referred to as maintenance control.

The controller 10 performs maintenance control according to the sheet type and the number of passed sheets in accordance with a predetermined program. That is, the controller 10 acquires the sheet type of the sheet P passing through the conveyance path 30 from the sheet detecting section 31 according to a predetermined program. Further, the controller 10 counts the number of sheets P passing through the conveyance path 30 according to the sheet type in accordance with a predetermined program. Then, the controller 10 performs maintenance control according to the sheet type of the sheet P and the number of passed sheets in accordance with the predetermined program.

The image forming apparatus 1 includes a motor 35. The motor 35 drives the sheet feed roller 20, the sheet feed roller 21, the registration roller 22, and the like to convey the sheet P. The motor 35 may drive a plurality of rollers by one motor. Further, the motor 35 may include a plurality of motors corresponding to the respective rollers. The controller 10 controls the motors 18 and 35 to convey the sheet P.

The image forming apparatus 1 may include a cleaning section 36. In the cleaning section 36, a cleaning member (not illustrated) is activated under the control of the controller 10 to clean the conveyance path 30. The cleaning section 36 cleans each of the rollers constituting the conveyance path 30, such as the sheet feed roller 20, the sheet feed roller 21, and the registration roller 22. The cleaning section 36 may be configured to clean some of the plurality of rollers forming the conveyance path 30 or may be configured to clean all the rollers. Furthermore, the cleaning section 36 may be configured to select and clean one or all of the plurality of rollers forming the conveyance path 30 under the control of the controller 10. Furthermore, the cleaning section 36 cleans the sheet guide 29 that forms the conveyance path 30. Thus, the cleaning section 36 removes sheet dust and the like adhering to the surface of each roller and the like.

The program for performing the maintenance control is stored in the storage section 32, but is not limited thereto. For example, a storage medium that stores the program is prepared. Then, the program stored in the storage medium may be stored in the storage section 32. The storage medium storing the program is, for example, an external storage medium such as a magnetic disk, an optical disk, or a solid state drive (SSD). Alternatively, the program may be stored in a server connected to the image forming apparatus 1 via the communication section 34 via a wired or wireless network. The program is transmitted from the server to the image forming apparatus 1 via the network and is stored in the storage section 32.

The controller 10 reads the program from the storage section 32 and executes the program. Thus, the maintenance control is performed. However, the maintenance control may be implemented by processing by a digital signal processor (DSP) instead of processing by the controller 10. A part of the maintenance control may be realized by the processing by the DSP, or all of the maintenance control may be realized by the processing by the DSP. In addition, the maintenance control may be realized by a process by the controller 10 and a process by the DSP. Similarly, the maintenance control may be implemented by processing by a dedicated hardware circuit instead of or in addition to the processing by software.

Figure 4:
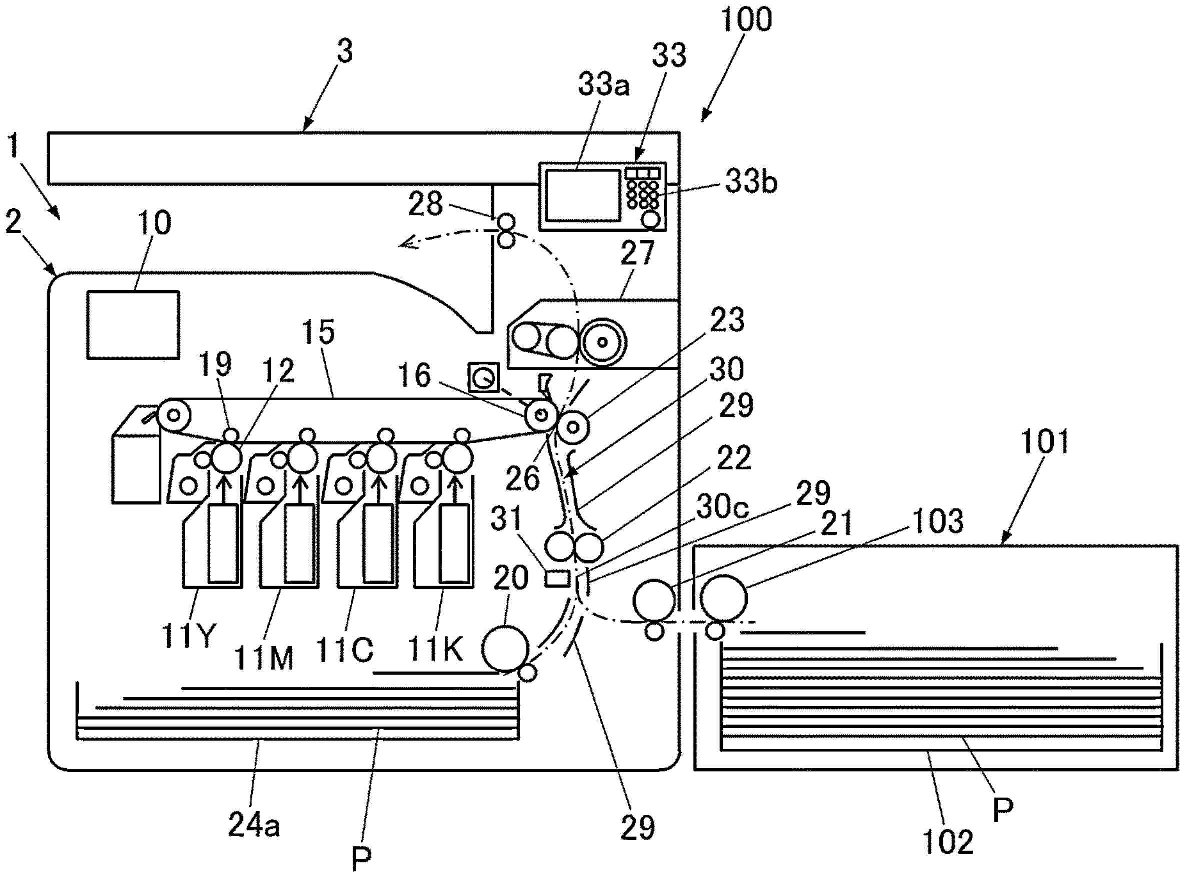
FIG. 4 is a configuration diagram illustrating an example of the image forming system of the present embodiment.

FIG. 4 is a configuration diagram illustrating an example of an image forming system according to the present embodiment. The image forming system 100 includes the above-described image forming apparatus 1 and the sheet feed device 101.

The sheet feeding device 101 includes a sheet feed cassette 102 and a sheet feed roller 103. The sheet feed cassette 102 stores a greater number of sheets P than the sheet feed cassette 24*a*. The sheet feed device 101 includes at least one sheet feed cassette 102. The sheet feed roller 103 feeds the sheet P from the sheet feed cassette 102 in conjunction with the image forming apparatus 1.

Note that the image forming system 100 may include a post-processing apparatus that includes at least a mechanism for binding sheets P with staples, a mechanism for punching holes in sheets P, a mechanism for sorting sheets P, and the like. The image forming system 100 may include both or either of the sheet feed device 101 and the post-processing apparatus (not illustrated) with respect to the image forming apparatus 1.

The image forming system 100 may include a cleaning section in each of the sheet feed device 101 and a post-processing device (not illustrated). The cleaning section of the sheet feed device 101 cleans the sheet feed roller 103 and the like constituting the conveyance path. The cleaning section of the post-processing apparatus cleans each roller or the like constituting the conveyance path.

<Operation Examples of Image Forming Apparatus, Image Forming System, and Computer-Readable Storage Medium Storing Program of the Present Embodiment>

Figure 5:
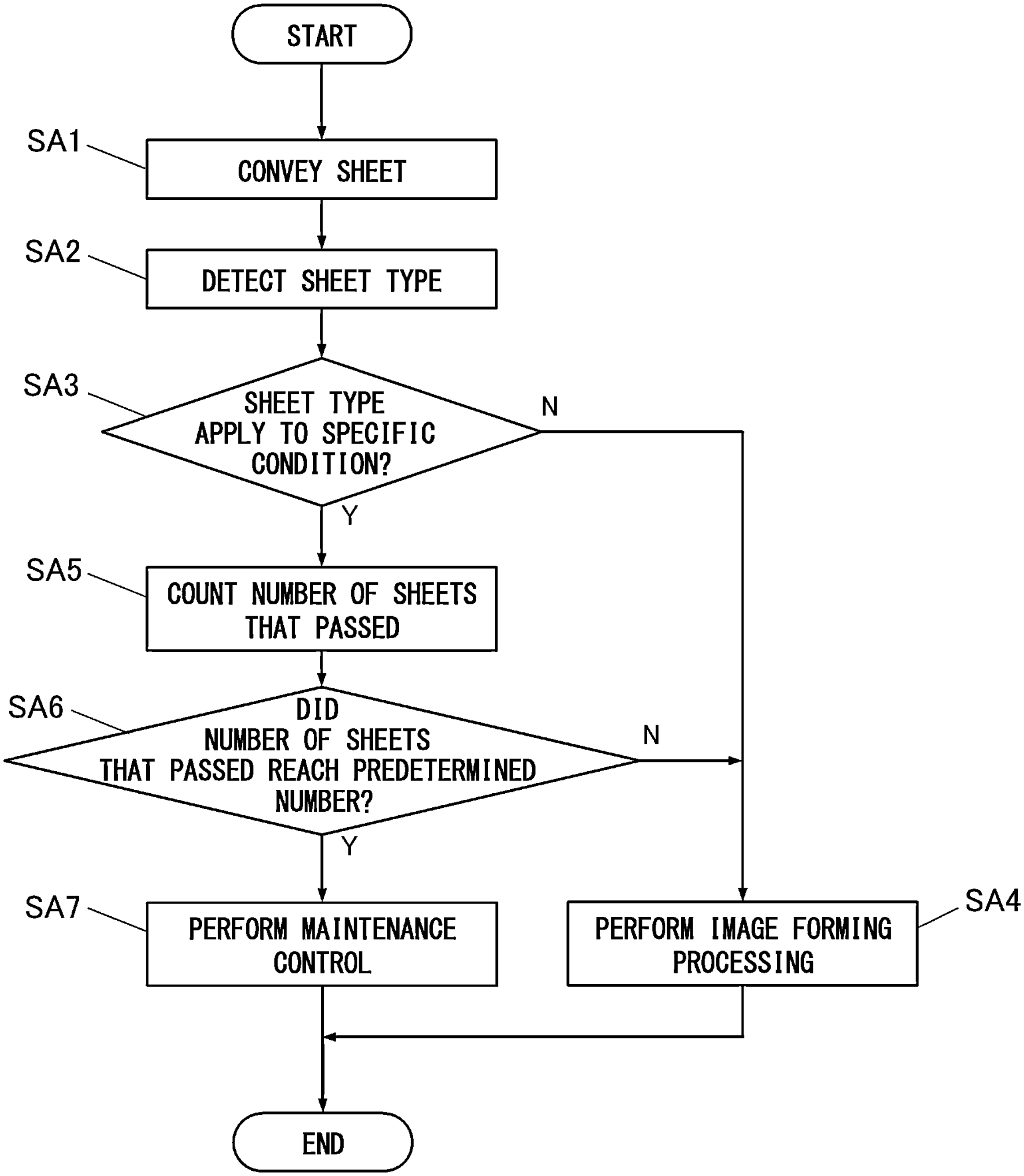
FIG. 5 is a flowchart illustrating an example of a method of controlling the image forming apparatus of the present embodiment.

FIG. 5 is a flowchart illustrating an example of a method of controlling the image forming apparatus of the present embodiment. Next, an example of processing of maintenance control performed in the image forming apparatus and the image forming system as a method of controlling the image forming apparatus will be described.

The controller 10 controls the motor 35 and the like in accordance with a program to convey the sheet P in step SA1. For example, in a case of feeding the sheet P from the sheet feed cassette 24*a*, the sheet feed roller 20 is rotated, and thus the sheet P is fed from the sheet feed cassette 24*a* to the conveyance path 30. When a sheet P is fed from the manual sheet feed tray 24*b*, the sheet feed roller 21 is rotated to feed the sheet P from the manual sheet feed tray 24*b* to the conveyance path 30.

The sheet P fed from the sheet feed cassette 24*a* or the manual sheet feed tray 24*b* reaches the registration roller 22 through the conveyance path 30*c*. The conveyance path 30*c* is provided with a sheet detecting section 31. The sheet detecting section 31 detects the sheet type of the sheet P in step SA2.

The controller 10 acquires the sheet type of the sheet P detected by the sheet detecting section 31. In step SA3, the controller 10 determines whether the sheet type detected by the sheet detecting section 31 satisfies a specific condition.

In step SA3, the controller 10 determines that the sheet type detected by the sheet detecting section 31 does not satisfy the specific condition. In this case, the controller 10 performs normal image formation processing in step SA4. In step SA3, the controller 10 determines that the sheet type detected by the sheet detecting section 31 satisfies the specific condition. In this case, the controller 10 counts the number of passed sheets of the sheet P in step SA5.

In step SA6, the controller 10 determines whether the number of passed sheets of the sheet P whose sheet type satisfies the specific condition has reached a predetermined number of sheets. When determining that the number of passed sheets of the sheet P whose sheet type satisfies the specific condition does not reach the predetermined number of sheets, the controller 10 performs normal image formation processing in step SA4. When determining that the number of passed sheets of the sheet P whose sheet type satisfies the specific condition has reached the predetermined number of sheets, the controller 10 executes predetermined maintenance control in step SA7.

As the maintenance control, the controller 10 may control the cleaning section 36 to clean the conveyance path 30 with the cleaning section 36. For example, in the case of a sheet that is likely to generate sheet dust, the sheet type satisfies the specific condition. As the number of such sheets P that passed increases, the amount of sheet dust adhering to the rollers forming the conveyance path 30 may increase.

Therefore, the cleaning section 36 cleans each of the rollers constituting the conveyance path 30, such as the sheet feed roller 20, the sheet feed roller 21, and the registration roller 22. Thus, the cleaning section 36 can remove sheet dust or the like adhering to the surface of each roller or the like at a predetermined timing under the control of the controller 10. The cleaning section 36 may clean the sheet guide 29 forming the conveyance path 30.

Further, as the maintenance control, the controller 10 may display, on the display part 33*a*, a message prompting predetermined maintenance such as cleaning or replacement of each roller constituting the conveyance path 30. Further, as the maintenance control, the controller 10 may transmit mail for prompting the above-described predetermined maintenance to a predetermined transmission destination registered in advance by the communication section 34.

Thus, a notification prompting a user or a person in charge of maintenance of the image forming apparatus 1 to check, clean, or replace each roller can be output at a predetermined timing. Further, the controller 10 may change the frequency of performing the maintenance control based on the sheet type of the sheet P and the number of passed sheets. For example, the frequency of performance of the maintenance control may be increased for the sheet P whose sheet type satisfies a particular condition, such as a tendency to generate sheet dust, compared with the sheet P whose sheet type does not satisfy the particular condition.

Note that in a configuration in which a plurality of sheet feed cassettes 24*a* are provided, the number of passed sheets for each sheet feed cassette 24*a* is stored. Then, the maintenance control may be performed based on the number of passed sheets for each sheet feed cassette.

In the image forming system 100, as the maintenance control, the controller 10 may control the cleaning section of the sheet feeding device 101 to clean the sheet feed roller 103 or the like constituting the conveyance path. Furthermore, the controller 10 may display, on the display part 33*a*, a message prompting predetermined maintenance such as cleaning and replacement of the sheet feed roller 103 constituting the conveyance path of the sheet feed device 101. Further, as the maintenance control, the controller 10 may transmit mail for prompting the above-described predetermined maintenance to a predetermined transmission destination registered in advance by the communication section 34. In addition, a sheet detecting section may be provided in the conveyance path of the sheet feed device 101 so that the sheet type of the sheet P fed from the sheet feed device 101 can be detected.

Further, as the maintenance control, the controller 10 may control a cleaning section of a post-processing apparatus (not shown) to clean each roller or the like constituting the conveyance path. Furthermore, the controller 10 may display, on the display part 33*a*, a message prompting predetermined maintenance such as cleaning and replacement of each of the rollers constituting the conveyance path of the post-processing apparatus. Further, as the maintenance control, the controller 10 may transmit mail for prompting the above-described predetermined maintenance to a predetermined transmission destination registered in advance by the communication section 34. Furthermore, a sheet detecting section may be provided in a conveyance path of the post-processing apparatus so that the sheet type of the sheet P being conveyed through the post-processing apparatus can be detected.

In the present invention, by providing the sheet detecting section in the conveyance path, it is possible to detect the sheet type of the sheet conveyed through the conveyance path. Thus, in the present invention, it is possible to perform maintenance control according to the sheet type without a user or the like of the image forming apparatus inputting the sheet type in advance. Further, even when the sheet type is changed, maintenance control corresponding to the sheet type is possible. Therefore, stable sheet conveyance can be achieved regardless of the type of sheet to be used.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-120348, filed on Jul. 25, 2023, including description, claims, drawings and abstract is incorporated herein by reference.

What is claimed is:

1. An image forming apparatus comprising:

an image former that forms an image on a sheet;

a conveyance path in which the sheet is conveyed to the image former;

a sheet detector that is provided in the conveyance path and that detects a type of the sheet conveyed on the conveyance path; and a controller that performs control related to maintenance of the conveyance path based on the type of the sheet detected by the sheet detector;

wherein the image forming apparatus further comprises a cleaner that operates under control of the controller to clean the conveyance path;

wherein the controller performs control related to the maintenance of the conveyance path by cleaning the conveyance path with the cleaner based on the type of the sheet detected by the sheet detector.

2. The image forming apparatus according to claim 1, wherein the controller counts a number of passed sheets conveyed on the conveyance path, and performs control related to the maintenance of the conveyance path based on the type of sheet and the number of passed sheets detected by the sheet detector.

3. The image forming apparatus according to claim 1, further comprising a display that displays information, wherein the controller displays, on the display, a message prompting maintenance of the conveyance path based on the type of the sheet detected by the sheet detector, and performs control related to the maintenance of the conveyance path.

4. The image forming apparatus according to claim 1, further comprising a communicator configured to perform communication, wherein the controller transmits e-mail prompting the maintenance of the conveyance path by the communicator based on the type of the sheet detected by the sheet detector, and performs control related to the maintenance of the conveyance path.

5. The image forming apparatus according to claim 1, wherein the controller changes a frequency of performing control related to maintenance of the conveyance path based on the type of the sheet detected by the sheet detector.

6. An image forming system comprising:

an image forming apparatus, wherein the image forming apparatus includes, an image former that forms an image on a sheet;

a conveyance path in which the sheet is conveyed to the image former;

a sheet detector that is provided in the conveyance path and that detects a type of the sheet conveyed on the conveyance path; and a controller that performs control related to maintenance of the conveyance path based on the type of the sheet detected by the sheet detector;

wherein the image forming apparatus further comprises a cleaner that operates under control of the controller to clean the conveyance path;

wherein the controller performs control related to the maintenance of the conveyance path by cleaning the conveyance path with the cleaner based on the type of the sheet detected by the sheet detector.

7. A non-transitory computer-readable storage medium storing a program to be executed by a controller of an image forming apparatus including an image former that forms an image on a sheet, and a conveyance path in which the sheet is conveyed to the image former, the program that causes the controller to execute:

detecting, by a sheet detector provided in the conveyance path, a type of the sheet conveyed on the conveyance path, and acquiring the type of the sheet detected by the sheet detector; and performing control related to maintenance of the conveyance path based on the type of the sheet detected by the sheet detector;

wherein the program further causes the controller to perform control related to the maintenance of the conveyance path by cleaning the conveyance path with a cleaner based on the type of the sheet detected by the sheet detector.

8. A method of controlling an image forming apparatus including an image former that forms an image on a sheet, and a conveyance path in which the sheet is conveyed to the image former, the method comprising:

detecting, by a sheet detector provided in the conveyance path, a type of the sheet conveyed on the conveyance path, and acquiring the type of the sheet detected by the sheet detector; and performing control related to maintenance of the conveyance path based on the type of the sheet detected by the sheet detector;

wherein the program further causes the controller to perform control related to the maintenance of the conveyance path by cleaning the conveyance path with a cleaner based on the type of the sheet detected by the sheet detector.

* * * * *